United States Patent [19]

Shirotori

[11] Patent Number: 4,907,897
[45] Date of Patent: Mar. 13, 1990

[54] BEARING DEVICE

[75] Inventor: Yozo Shirotori, Nagano, Japan

[73] Assignee: Kabushiki Kaisha Sankyo Seiki Seisakusho, Nagano, Japan

[21] Appl. No.: 111,232

[22] Filed: Oct. 22, 1987

[30] Foreign Application Priority Data

Oct. 22, 1986 [JP] Japan ................................. 86-249512

[51] Int. Cl.$^4$ ............................................. F16C 19/08
[52] U.S. Cl. ..................................... 384/446; 384/478; 384/493; 384/512; 384/912
[58] Field of Search ............... 384/517, 493, 478, 512, 384/133, 446, 912, 905, 557, 278

[56] References Cited

U.S. PATENT DOCUMENTS

| 4,065,190 | 12/1977 | Hallerback | 384/493 |
| 4,173,376 | 11/1979 | Standing et al. | 384/517 |
| 4,531,846 | 7/1985 | Raj | 384/478 |
| 4,605,321 | 8/1986 | Brandenstein et al. | 384/512 |
| 4,628,384 | 12/1986 | Raj et al. | 384/478 |

Primary Examiner—Lenard A. Footland
Attorney, Agent, or Firm—Sughrue, Mion, Zinn, MacPeak & Seas

[57] ABSTRACT

An improved bearing device for use in a spindle motor for driving computer hard disks is disclosed. The device includes a shaft, bearings supporting the shaft, and a bearing holder for holding the bearings. The bearing holder is made of a magnetic material. The shaft, the bearings, and the bearing holder are made of materials having substantially the same thermal expansion coefficient.

10 Claims, 2 Drawing Sheets

BEARING DEVICE

BACKGROUND OF THE INVENTION

The present invention relates to a bearing device used in an electric motor employed for driving a computer hard disk having a high recording density and capacity.

A bearing device in a spindle motor for driving a hard disk of a type earlier designed by the present applicant (not prior art) is arranged as shown in FIG. 1. Data signal recording media having a high recording density and capacity, namely, magnetic disks 17, are mounted on a hub 6 fixedly fitted on one end portion of the rotary shaft of the spindle motor. A bearing 33 is fixedly positioned in a bearing holder 9 with a retainer 32. A coil spring 36 is positioned with a retainer 35 in such a manner that it is held between the retainer 35 and another bearing 34 which is movably fitted in the bearing holder. The coil spring 36 applies pressure to the bearing 34 to minimize the amount of play between the balls and the inner and outer races. A rotor case 29 is fixedly mounted on the other end portion of the rotary shaft so that the inclination of the shaft and accordingly the inclination of the magnetic disks is minimized. A magnetic seal mechanism including a magnet 16 held between two yokes 14 and 15 and a magnetic fluid 17 is provided at the upper end portion of the bearing holder so that metal powder formed by abrasion of the bearings is prevented from being scattered to the outside. A shield yoke 37 is fixedly fitted on the upper end portion of the bearing holder to prevent the magnetic disks from being affected by the magnet 16.

In this bearing device, the bearing holder is made of aluminum or steel (SUS 303), the bearings are made of bearing steel, and the shaft is made of steel (SUS 416), for instance. That is, these components are formed from different materials, and accordingly they have different thermal expansion coefficients. As a result, as the temperature of the bearing device changes, gaps are formed between the components, the shaft is inclined, and the magnetic disks are tilted. Furthermore, the shield yoke 37 and the retainers 32 and 35 have smaller thermal expension coefficients than the bearing holder. Therefore, as the temperature of the bearing device changes, the bearing holder, being locally strained, tends to deform. As a result, it is difficult to maintain the recording reproducing heads in stable sliding contact with the magnetic disks; that is, it is impossible to perform high density recording and errors are liable to occur during recording.

SUMMARY OF THE INVENTION

In view of the foregoing, an object of this invention is to provide a bearing device in which the shaft, the bearings and the bearing holder respond substantially the same to changes in temperature so that the amount of inclination of the shaft due to temperature changes is minimized, whereby high precision is maintained.

A specific feature of the invention resides in a bearing device comprising a shaft, bearing supporting the shaft, and a bearing holder adapted to hold the bearing, in which the shaft, the bearings, and the bearing holder are made of materials which have substantially the same thermal expansion coefficient.

DESCRIPTION OF THE PREFERRED EMBODIMENTS

The invention will now be described with reference to preferred embodiments shown in the accompanying drawings.

Figure 2:
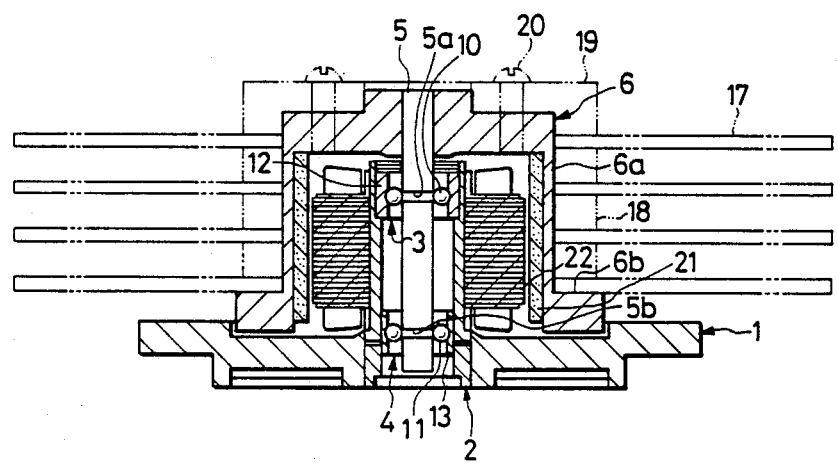
FIG. 2 is a sectional side view showing a first example of a bearing device according to the invention which is used in an electric motor for driving hard disks.
Figure 3:
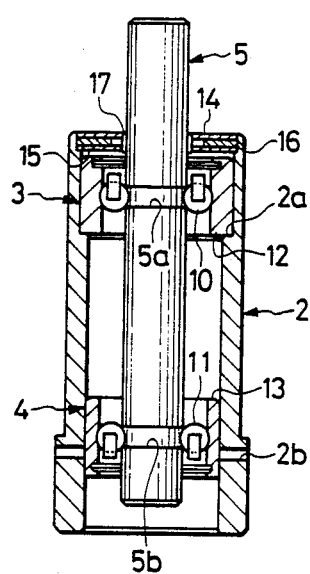
FIG. 3 is an enlarged sectional view showing the first example of the bearing device according to the invention.

FIGS. 2 and 3 show a first embodiment of a bearing device of the invention. As shown in FIGS. 2 and 3, in the inventive bearing device, the lower end portion of a bearing holder 2, which is substantially in the form of a cylindrical pipe, is fitted in a central hole formed in a housing 1, and bearings 3 and 4 with no inner race are fitted in the bearing holder 2 to support a shaft 5. The bearing 3 includes balls 10 engaged with an annular groove 5a formed in the shaft 5 and an outer race 12. Similarly, the bearing 4 includes balls 11 engaged with an annular groove 5b formed in the shaft 5 and an outer race 13.

A magnet 16 held between two yokes 14 and 15 is fitted in the upper portion of the bearing holder 2. A seal mechanism impregntaed with magnetic fluid 17 is provided between the shaft and the inner peripheries of the yokes.

A hub 6 is fixedly mounted on the upper end portion of the shaft 5. A plurality of magnetic disks 17 together with spacers 18 are mounted on the cylindrical outer wall of the hub 6. A disk clamp 19 is secured to the hub 6 with screws 20 so that the magnetic disks 17 are secured to the hub 6. Rotor magnets 21 are fixedly secured to the inner cylindrical wall of the hub 6.

A stator core 22 is mounted on the bearing holder 2 and secured to the latter with an adhesive agent, or to the housing 1 with screws (not shown).

The bearings 3 and 4 are secured to the bearing holder 2 as follows: A step 2a is formed in the upper portion of the inner wall of the bearing holder 2. The bearings 3 and 4 fitted on the shaft 5 are inserted into the bearing holder 2 from above by shrink fitting until the outer race 12 of the upper bearing 3 abuts against the step 2a. The outer race is secured with adhesive. Thereafter, the outer race 13 of the lower bearing 4 is pushed upwardly, and is fixed with an adhesive injected through small holes 2b.

When the bearings 3 and 4 have been secured in the above-described manner, the balls 10 and 11 are pushed against the edges of the grooves 5a and 5b under pressures to be positioned at a predetermined position so that play is absorbed.

In the above-described bearing device, the bearing holder 2 is made of martensite stainless steel (SUS 403), the bearings 3 and 4 of bearing steel (SUj2), and the shaft of martensite stainless steel (SUS 420).

The bearing holder 2, the bearing 3 and 4, and the shaft 5 may be made of martensite stainless steel (SUS 403) or bearing steel (SUj2).

The thermal expansion coefficients of the aforementioned steel materials are as follows:

Martensite stainless steel:
(SUS 403) --- $9.9 \times 10^{-6}/°C$.
(SUS 420) --- $10.3 \times 10^{-6}/°C$.
Bearing steel --- $9.8 \times 10^{-6}/°C$.

Thus, in the above-described bearing device, the bearing holder 2, the bearing 3 and 4, and the shaft 5 are made of materials which have substantially equal thermal expansion coefficients. Hence, the assembly is stable in the face of thermal changes. Therefore, the shaft 5 is substantially prevented from being thermally deformed. Thus, when the bearing device is used in a hard disk driving motor, high density and high capacity recording and reproducing operations can be stably performed, and the occurrence of errors is greatly reduced.

As described above, the bearing device is of the predetermined position pressurization type. Therefore, the pressurization is maintained unchanged, and the load characteristic of the bearing device is maintained stable.

Furthermore, because the play of the bearing in the radial direction is absorbed, the shaft is substantially prevented from being deformed by heat.

In addition, since the bearing holder 2 is made of magnetic material, the bearing device of the invention needs no shield yoke 37 as must be included in the conventional bearing device. That is, the shield yoke, the retainers 32 and 35, and the O-ring 38 of the conventional bearing device described above are not used in the bearing device of the invention. Therefore, in the bearing device of the invention, the bearing holder 2 is not strained.

Figure 4:
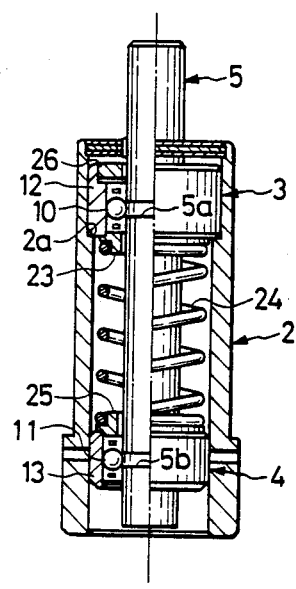
FIG. 4 is a sectional side view showing a second example of a bearing device according to the invention.

FIG. 4 shows a second embodiment of the invention. In this embodiment, a step 2a is formed in the inner wall of a bearing holder 2. A bearing 3 is inserted into the bearing holder until it abuts against the step 2a, and it is secured with an adhesive. As a result, the balls 10 and 11, engaged with annular grooves 5a and 5b formed in a shaft 5, are pushed against the edges of these grooves under a predetermined pressure. Another collar 26 is fitted on the upper end portion of the shaft 5.

Similar to the first embodiment, in the second embodiment the bearing holder, the bearings 3 and 4, and the shaft 5 are made of materials having substantially equal thermal expansion coefficients.

Figure 5:
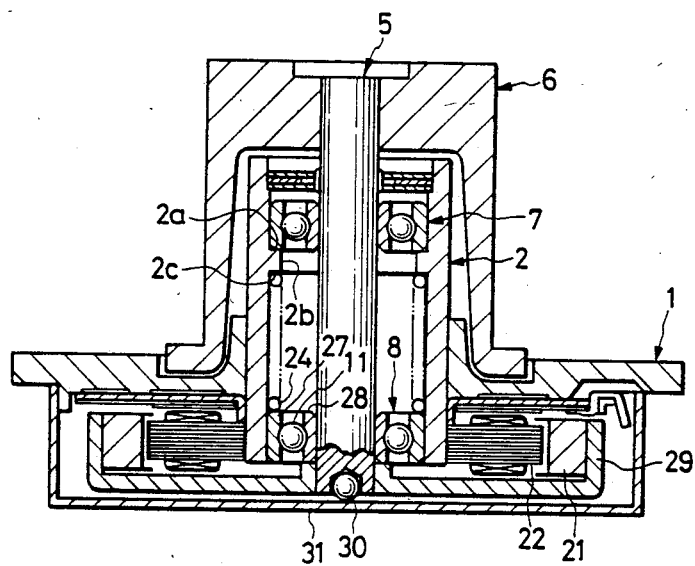
FIG. 5 is a sectional side view showing a third example of a bearing device according to the invention.

FIG. 5 shows a third embodiment of the invention. Bearings 7 and 8, each having an inner race and an outer race, are fitted in a bearing holder 2 and secured thereto with an adhesive, thus supporting a shaft 5. The bearing 7 is positioned on the upper step 2a of a protrusion 2b extending inwardly from the inner wall of the bearing holder 2. A coil spring 24 is positioned on the lower step 2c of the protrusion 2b in such a manner that it is located between the lower step 2c and the bearing 8. Therefore, the balls 11 of the bearing 8 are pushed against the lower edge of the groove in the outer race 27 and the upper edge of the groove in the inner race 28 under a predetermined pressure.

Figure 1:
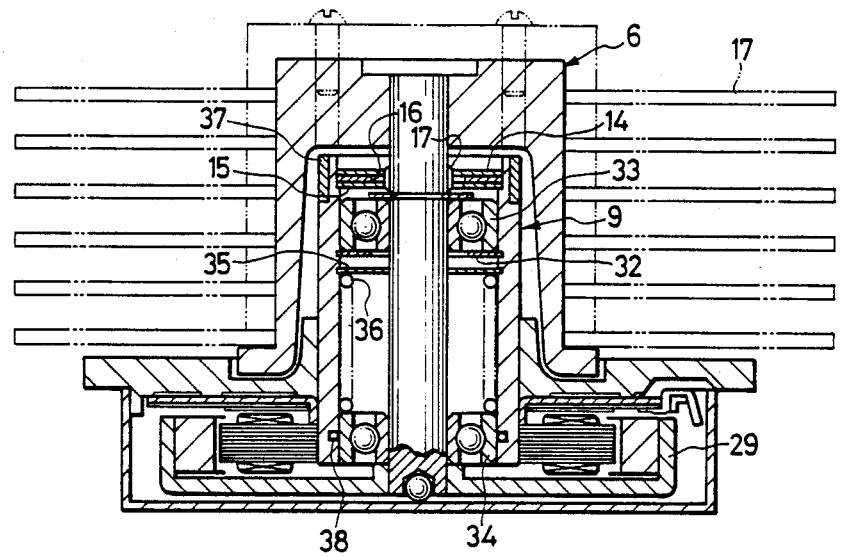
FIG. 1 is a sectional side view showing an example of a conventional bearing device used in an electric motor for driving hard disks.

Similar to the conventional bearing device of FIG. 1, the lower end portion of the bearing holder 2 is secured to the housing 1, a hub 6 is fixedly mounted on the upper end portion of the shaft 5, and a rotor case 29 is secured to the lower end portion of the shaft 5. Rotor magnets 21 are fixedly secured to the inner wall of the rotor case 29, and a stator core is fixedly secured to the lower end portion of the outer cylindrical wall of the bearing holder 2 in such a manner that it confronts the rotor magnets 21. A ball 30 fitted in the lower end face of the shaft 5 is positioned on a receiving place 31 secured to the housing 1.

In the above-described embodiments, the bearings 3, 4, 7 and 8 are ball bearings. However, metal bearings having substantially equal thermal expansion coefficients may be employed.

As described above, in the bearing device of the invention, the shaft, the bearings and the bearing holders are made of materials which have substantially equal thermal expansion coefficients. Therefore, even if the dimensions of these components change with the temperature of the bearing device, no gaps are formed between the various components, and accordingly the shaft is not deformed by heat. Thus, the bearing device of the invention is highly precise and can be applied to a variety of rotary machines, especially to an electric motor for driving a hard disk in which the inclination of the shaft should be as small as possible. In the latter case, the magnetic disk is not inclined due to thermal deformation of its shaft, and therefore the recording and reproducing head can be brought into sliding contact with the magnetic disk with high stability. Accordingly, with the bearing device of the invention, high density and high capacity recording operations can be achieved with significantly less error.

What is claimed is:

1. A bearing device comprising: a housing; a bearing holder having substantially the form of a cylindrical pipe, a lower end of said bearing holder being fitted in a central hole formed in said housing, said bearing holder being made of a magnetic material; a shaft; first and second ball bearings fitted in said hearing holder and supporting said shaft; two yokes and a magnet held between said two yokes and fitted in an upper portion of said bearing holder; and a seal mechanism impregnated with magnetic fluid fitted between said shaft and inner peripheries of said yokes; said shaft, said bearings, and said bearing holder being made of materials which have substantially equal thermal expansion coefficients.

2. The bearing device of claim 1, wherein said ball bearings have no inner races, and the balls of said ball bearings ride in respective grooves formed in an outer surface of said shaft.

3. The bearing device of claim 1, wherein one of said bearings is fitted against a step formed in an upper portion of an inner wall of said bearing holder, is shrink-fitted into said upper portion of said bearing holder, and is held therein with an adhesive, and the other of said bearing is fitted in a lower portion of said inner wall of said bearing holder and held therein with an adhesive injected through holes formed in said inner wall.

4. The bearing device of claim 3, further comprising a coil spring fitted between said bearings.

5. The bearing device of claim 4, further comprising collars disposed between respective ends of said coil spring and said bearing holders.

6. The bearing device of claim 3, wherein said ball bearings have inner and outer races, and further comprising a coil spring fitted between the lower one of said bearings and a surface of said step opposite the upper one of said bearings.

7. The bearing device of claim 1, wherein said shaft and said bearing holder are made of martensite stainless steel and said bearings are made of bearing steel.

8. The bearing device as claimed in claim 1, wherein said shaft, said bearings and said bearing holder are made of martensite stainless steel.

9. The bearing device as claimed in claim 1, wherein said shaft, said bearing and said bearing holder are made of bearing steel.

10. A bearing device comprising:

a shaft;

bearings supporting such shaft;

a bearing holder adapted to hold said bearings, wherein said shaft, said bearings and said bearing holder are made of materials which have substantially equal thermal expansion coefficients;

a hub rotated together with said shaft, said hub supporting magnetic disks;

rotor magnets rotated together with said shaft; and a stator confronting said rotor magnets.

* * * * *